Sept. 27, 1960     E. S. STORK ET AL     2,954,159
COMPARATOR MEANS FOR ACCOUNTING MACHINES
Filed Dec. 22, 1958     10 Sheets-Sheet 1
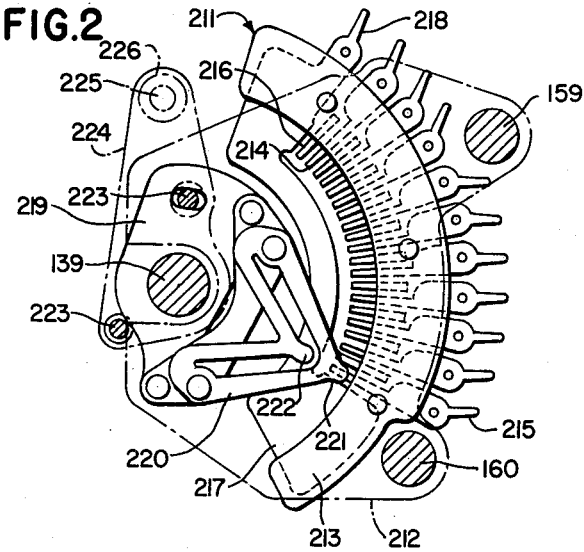
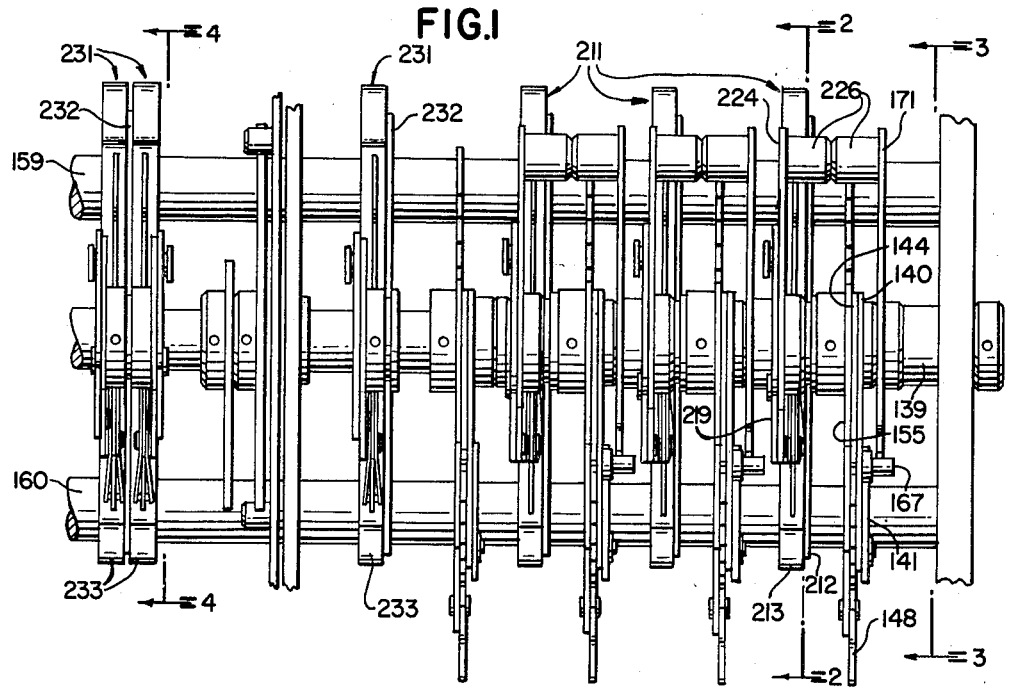
INVENTORS
EDWARD S. STORK
WILLIAM C. ARNOLD
BY *Louis A. Kline*
*Albert L. Sessler, Jr.*
THEIR ATTORNEYS

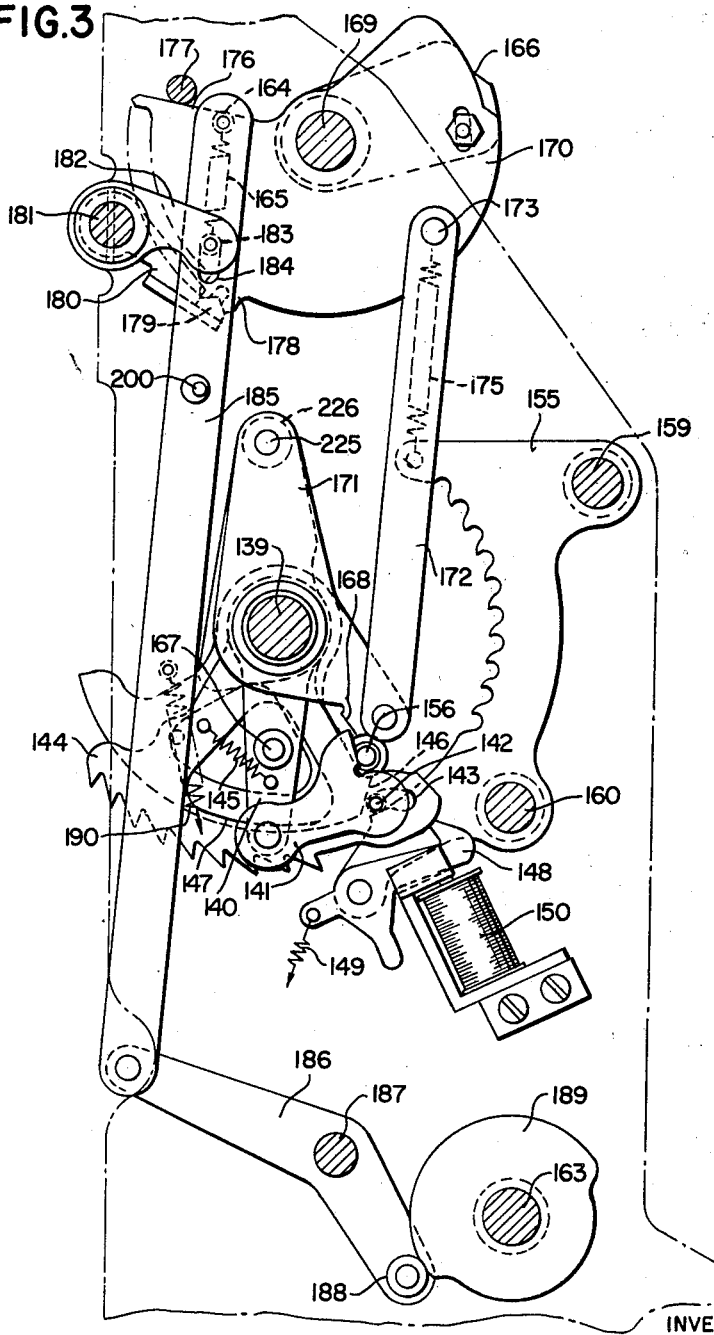

Sept. 27, 1960 E. S. STORK ET AL 2,954,159
COMPARATOR MEANS FOR ACCOUNTING MACHINES
Filed Dec. 22, 1958 10 Sheets-Sheet 3
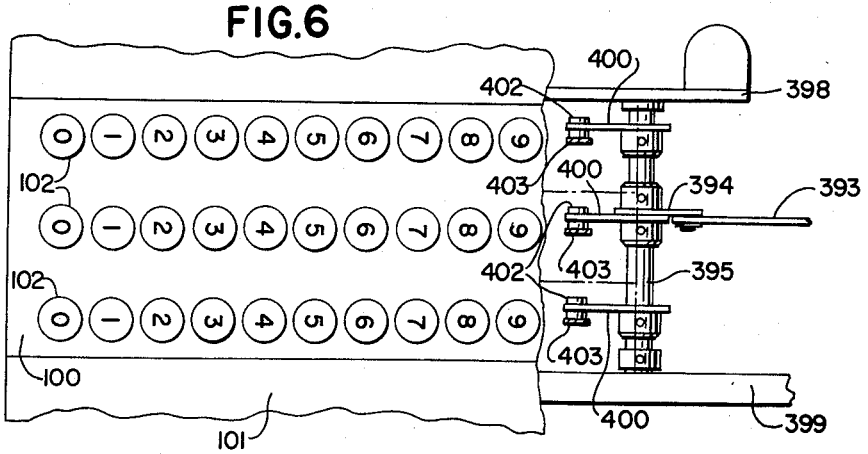
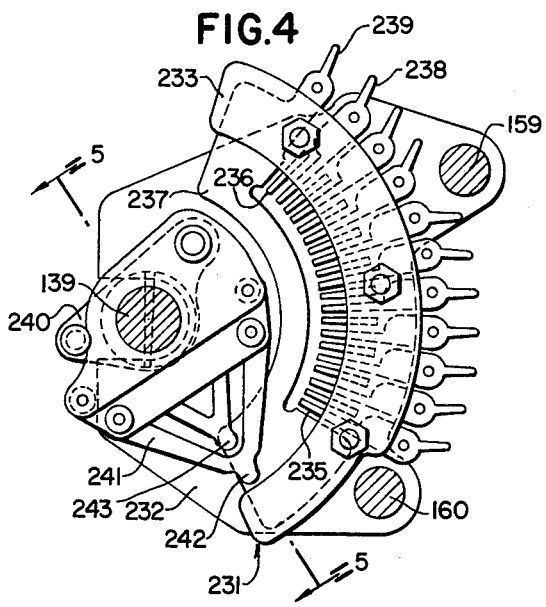
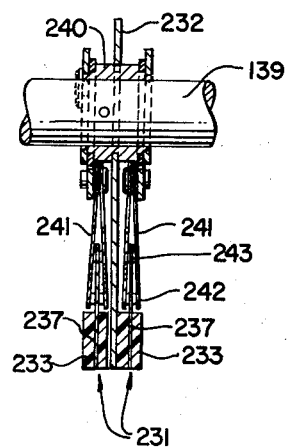
INVENTORS
EDWARD S. STORK
WILLIAM C. ARNOLD
BY
THEIR ATTORNEYS

INVENTORS
EDWARD S. STORK
WILLIAM C. ARNOLD

BY Louis A. Kline
Albert L. Sessler

THEIR ATTORNEYS

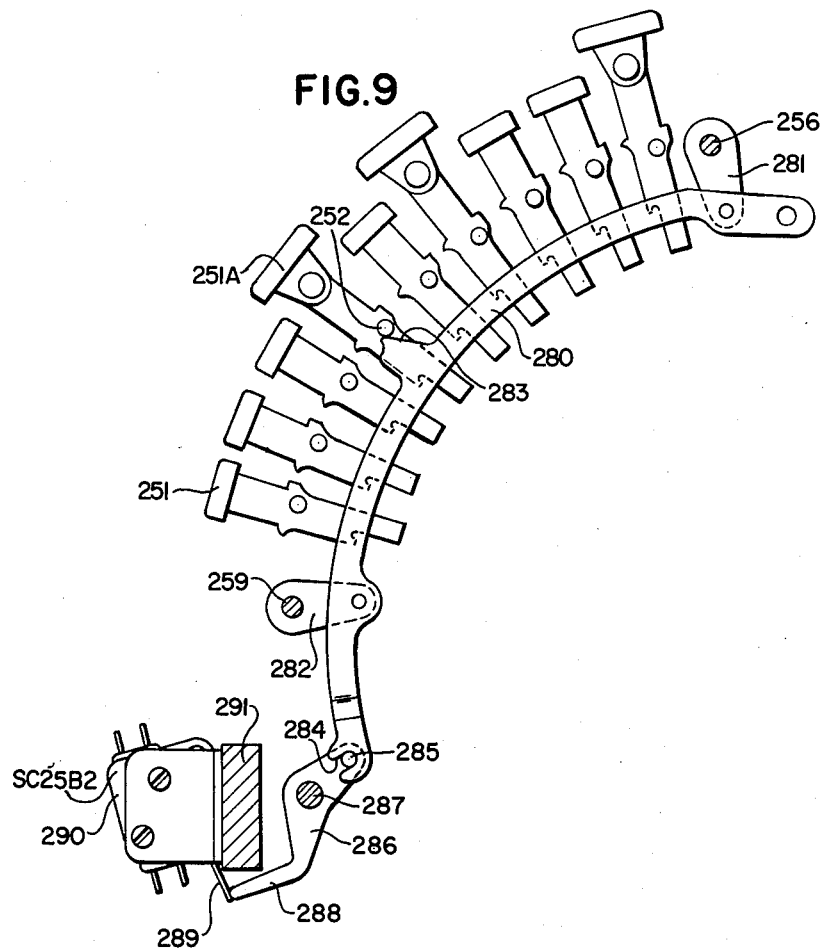

Sept. 27, 1960 E. S. STORK ET AL 2,954,159
COMPARATOR MEANS FOR ACCOUNTING MACHINES
Filed Dec. 22, 1958 10 Sheets-Sheet 6
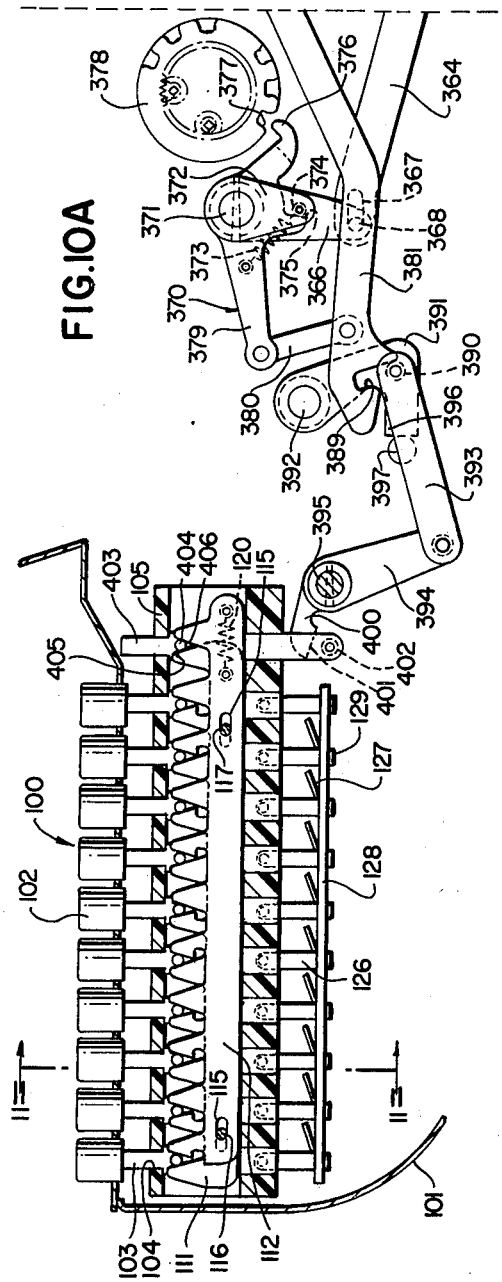
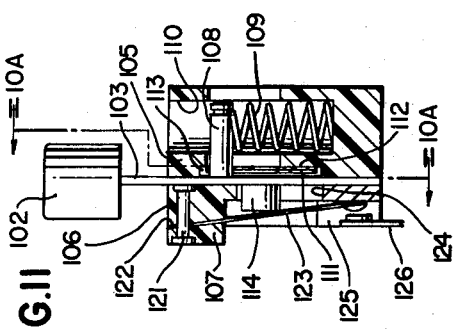
INVENTORS
EDWARD S. STORK
WILLIAM C. ARNOLD
BY *Louis A. Kline*
*Albert L. Sessler, Jr.*
THEIR ATTORNEYS

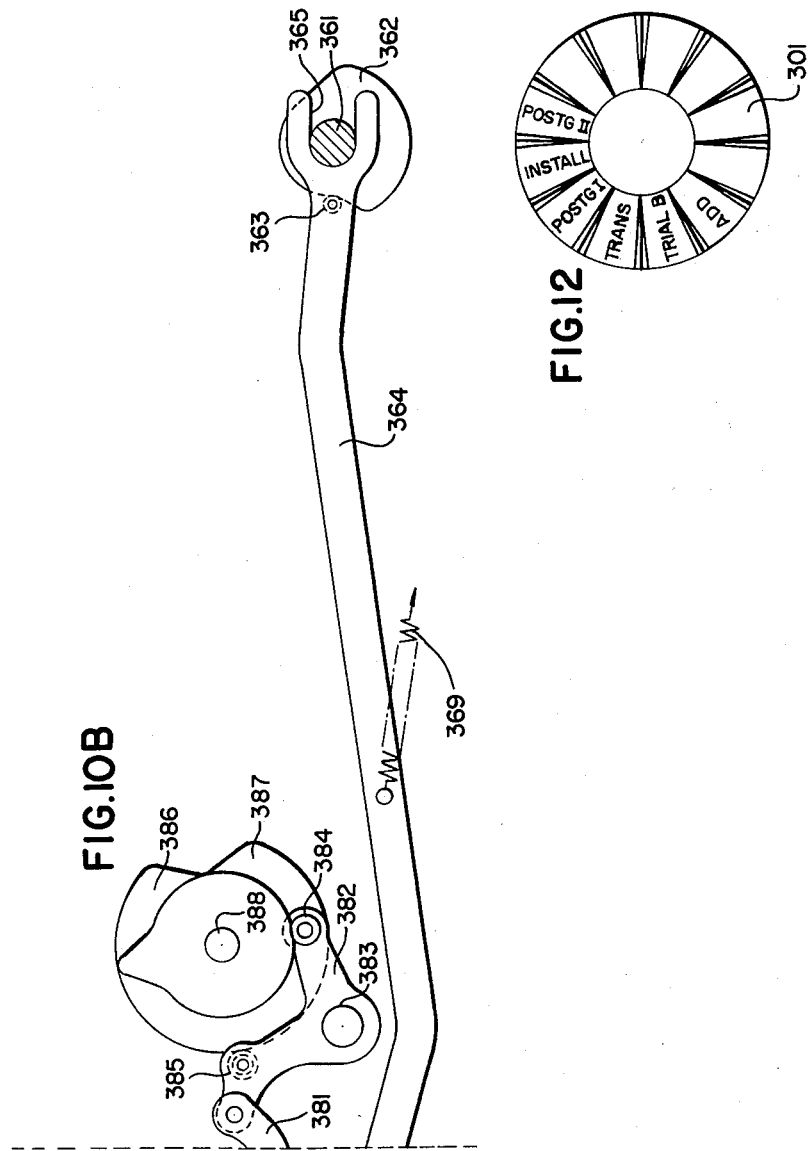

Sept. 27, 1960 E. S. STORK ET AL 2,954,159
COMPARATOR MEANS FOR ACCOUNTING MACHINES
Filed Dec. 22, 1958 10 Sheets-Sheet 8
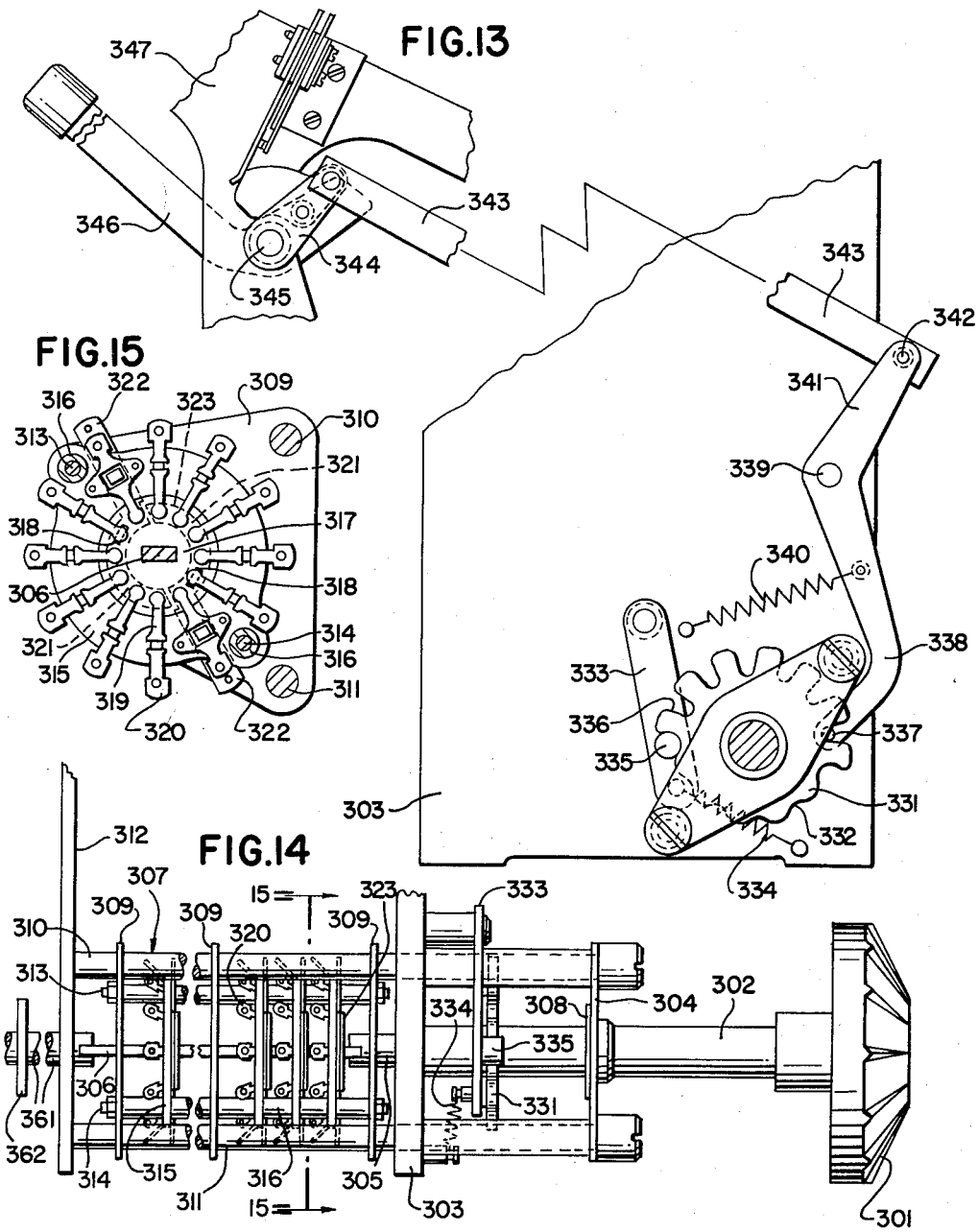
INVENTORS
EDWARD S. STORK
WILLIAM C. ARNOLD
BY *Louis A Kline*
*Albert L. Sessler, Jr.*
THEIR ATTORNEYS

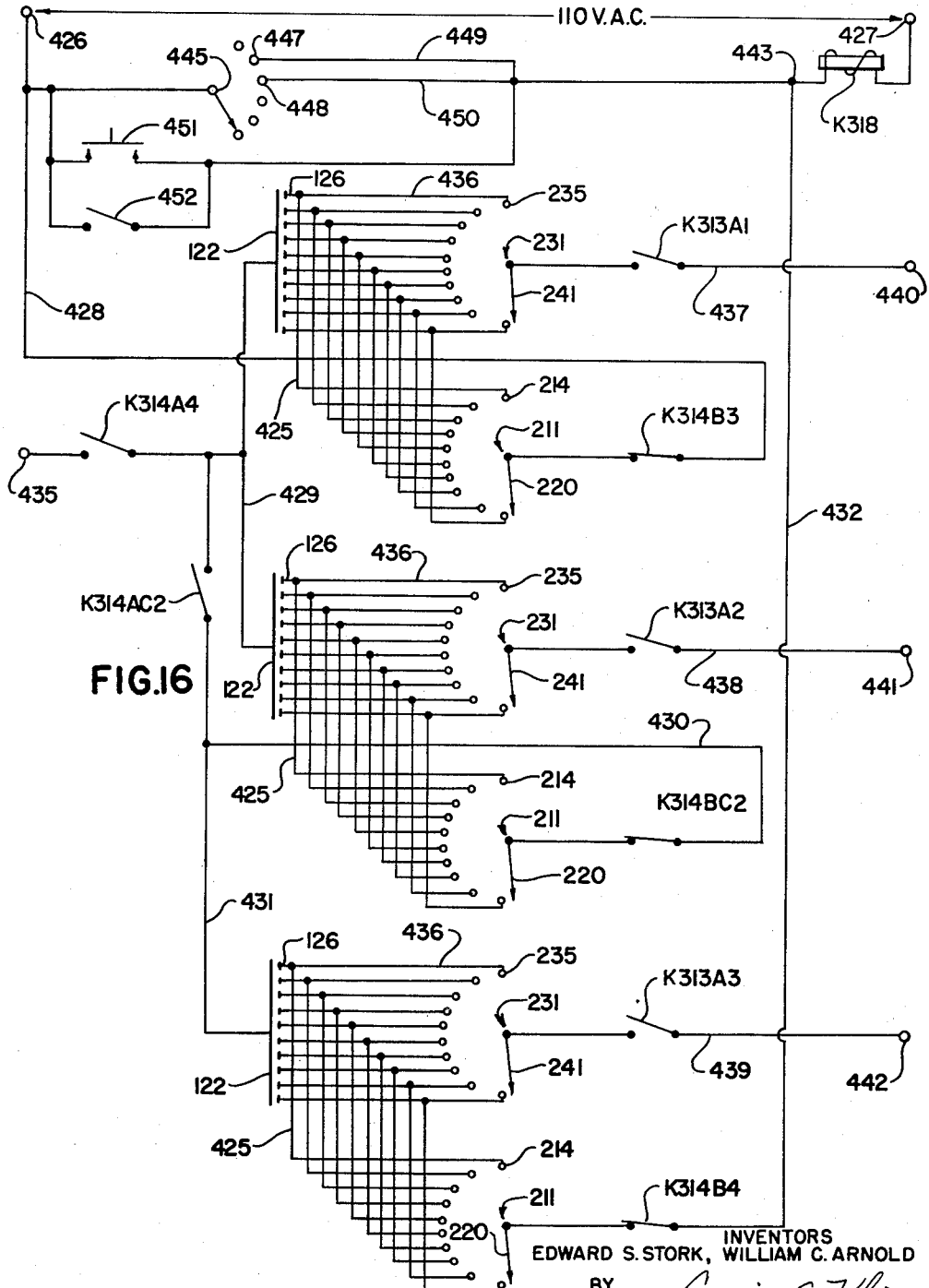

Sept. 27, 1960      E. S. STORK ET AL      2,954,159
COMPARATOR MEANS FOR ACCOUNTING MACHINES
Filed Dec. 22, 1958      10 Sheets-Sheet 10
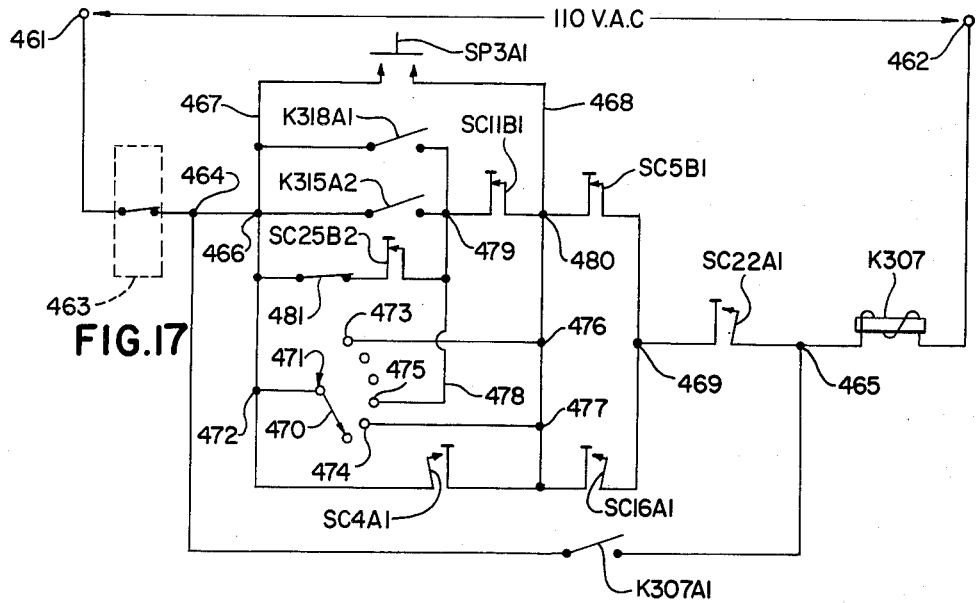
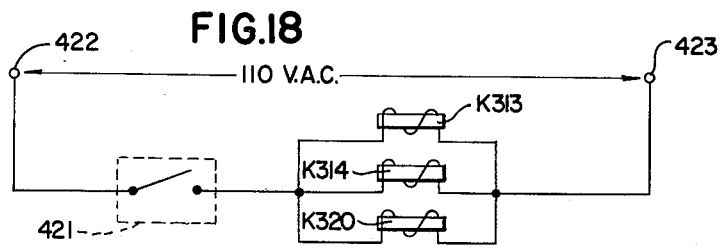
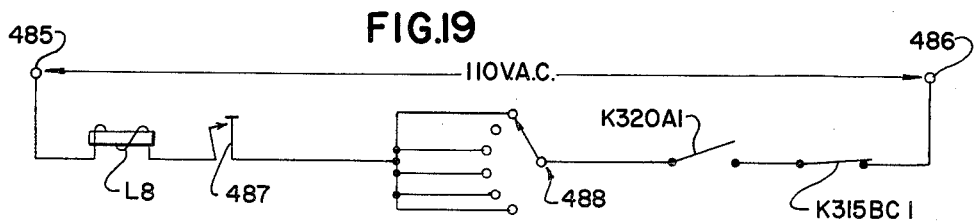
INVENTORS
EDWARD S. STORK
WILLIAM C. ARNOLD
BY *Louis A. Kline*
*Albert L. Sessler Jr.*
THEIR ATTORNEYS

United States Patent Office 2,954,159
Patented Sept. 27, 1960

2,954,159

COMPARATOR MEANS FOR ACCOUNTING MACHINES

Edward S. Stork and William C. Arnold, Dayton, Ohio, assignors to The National Cash Register Company, Dayton, Ohio, a corporation of Maryland Filed Dec. 22, 1958, Ser. No. 782,159

7 Claims. (Cl. 235—61.7)

The invention relates generally to accounting machines which operate in conjunction with a magnetically coded ledger card to enable the picking up of an old balance and other information from the ledger card and the subsequent recording of a new balance and other information on the ledger card at the end of an accounting transaction. In particular, the invention relates to such a machine in which a comparator number is also magnetically coded on the ledger card, and in which the machine is capable of comparing this number with the corresponding number of every item entered during the accounting transaction, a disparity in comparator numbers resulting in locking up of the machine.

The present invention is well adapted for use with an accounting machine of the type disclosed in the United States patent application Serial No. 610,754, filed September 19, 1956, by inventors Konrad Rauch et al., now Patent No. 2,947,475, issued August 2, 1960, but is not limited to use with such a machine.

In the above-cited patent application, the accounting machine there shown is capable of comparing a comparator number, such as an account number, for the first item entry with the corresponding number magnetically encoded on the ledger card, but, since the comparator number taken from the ledger card is not stored after the first item entry operation, the comparator numbers relating to further item entries cannot be compared with the comparator number encoded on the ledger card. Thus it is possible that an item may be entered in the wrong account.

The present invention provides means to eliminate this possibility. The comparator number picked up from the magnetic encoding on the ledger card may be retained in the accounting machine during a complete accounting transaction which includes a plurality of item entries, and this ledger card comparator number information will not be lost until another comparator number is picked up from the following ledger card during the next accounting transaction. This means that the comparator number from the ledger card will be retained in the machine for the entire accounting transaction and may be compared with the comparator numbers of all of the item entries, thus eliminating a possible source of inaccuracy.

In addition, a novel function control means is provided which enables a selection to be made as to whether it is desired to compare comparator numbers for all of the items, or merely for some of them. Several variations of this may be selected.

Also, in order to facilitate operation of the keyboard which is used for entry of the item comparator numbers, restoring means controlled by the function control means are provided for releasing the depressed keys after each item entry.

Accordingly, it is an object of the present invention to provide an accounting machine capable of picking up an old balance and a control number from a ledger card, accepting a plurality of item entries with a comparator number associated with each, refusing entries in which the comparator number does not correspond to that on the ledger card, and producing a new balance.

A further object of the invention is to provide an accounting machine having a comparator keyboard for entering comparator numbers with each item entry for comparison with a comparator number on a ledger card, and having means to restore the keys on the keyboard to undepressed position after each item entry.

An additional object is to provide an accounting machine having a function control means which may be set to determine which item entries will have corresponding comparator numbers compared with the comparator number on a ledger card to insure the correctness of posting in the proper account.

Another object of the invention is to provide comparator number comparing means in an accounting machine for comparing a comparator number read from a ledger card with a comparator number set up in a comparator number keyboard either for certain items only or for every item entered into the machine and for preventing the entry of data into the machine unless these numbers agree.

With these and other objects, which will become apparent from the following description, in view, the invention includes certain novel features of construction and combinations of parts, a preferred form of embodiment of which is hereinafter described with reference to the drawings which accompany and form a part of this specification.

In the drawings:

Fig. 1 is a side-spacing view of the comparator switch assembly of the present invention.

Fig. 2 is a sectional view of a switch unit taken along line 2—2 of Fig. 1.

Fig. 3 is a sectional view of a comparator differential mechanism taken along line 3—3 of Fig. 1.

Fig. 4 is a sectional view of a switch unit taken along line 4—4 of Fig. 1.

Fig. 5 is a sectional view of a switch unit taken along line 5—5 of Fig. 4.

Fig. 6 is a plan view, partly broken away, of the comparator keyboard.

Fig. 9 is another detail view of the control row shown in Fig. 8, showing another switch controlled by depression of one of the keys in said row.

Figure 7:
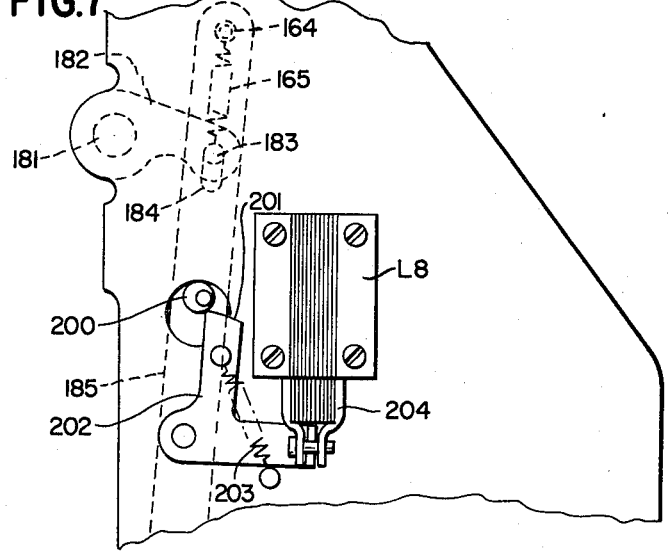
Fig. 7 is a fragmentary detail view showing solenoid-operated means for retaining the comparator liner in engaged position.

Figs. 10A and 10B taken together constitute a detail sectional view of the key-restoring mechanism for the comparator keyboard.

Fig. 11 is a detail sectional view taken along line 11—11 of Fig. 10A.

Fig. 12 is a view of the function control knob of the accounting machine.

Fig. 13 is a detail view of the mechanism for retaining the function control knob in position except when it is desired to shift the knob from one position to another.

Fig. 14 is a detail view of the function control mechanism.

Fig. 15 is a sectional view taken along line 15—15 of Fig. 14, showing one of the switch wafers controlled by the function control mechanism.

Figs. 16 to 19 inclusive show various operating circuits utilized in an accounting machine embodying the present invention.

GENERAL DESCRIPTION

The present invention is shown embodied herein in an accounting machine of the type described and claimed in the United States patent application Serial No. 610,754, filed September 19, 1956, by Konrad Rauch et al. This accounting machine is controlled from a ledger card on which are printed the usual amounts pertaining to the account, such as the checks and deposits, the balances after each transaction entry, the check count, the sign of the balance, the date, etc. In addition, the ledger card has recorded thereon magnetically the last balance and related data, such as the comparator number, which in this case is the account number, the sign of the balance, the check count, and the number of the line on which the next entry is to be printed on the ledger card. A plurality of sensing and recording heads are provided on the accounting machine for sensing the data which is magnetically encoded on the ledger card, and for erasing previously stored data and recording new data thereon. The heads are electrically connected to data-retaining means in the accounting machine, so that data on the ledger card may be entered into the accounting machine, and so that data produced by the accounting machine may be recorded on the card. The machine is also controlled from a keyboard, on which data may be set to be printed on the card and to be combined with data read from the card to form new balances. In a new-balance-recording operation, the data pertaining to the new balance is printed on the ledger card; the previous magnetically stored data is erased; and the new balance and related data pertaining to the new balance are magnetically stored on the card in its place.

In addition to the usual interlocks which have previously been provided on bank posting machines, the machine is provided with further safeguards to insure correctness of the pickup operation. One of these safeguards is a check to be sure that all of the data has been sensed or read from cards. Failure to read any data wil prevent the entry of the remaining data into the machine and will cause the card to be immediately fed from the machine.

Another of these safeguards is a check to be sure that the data which was read has been correctly entered into the machine by comparing the data actually set in the machine with the data actually recorded on the card. This is accomplished by first reading the ledger card and controlling the setting of the machine according to the data which was read and then reading the card a second time and comparing this second reading with the actual setting of the machine. If there is no agreement, the further normal operation of the machine is prevented, and only a corrective operation of the machine may take place.

A further safeguard cooperates with the above two safeguards to insure that overprinting on the ledger card will be avoided. This involves the automatic recording of the line number on the card corresponding to the line on which the next printing is to be made. Accordingly, if the number is read correctly and is correctly set in the machine, as indicated by the two safeguards previously mentioned, then the card will be positioned in the next operation with the proper line thereon in printing position.

The accounting machine is provided with a further safeguard to insure correctness of entries. As previously described, a comparator keyboard is provided, on which a comparator number, such as the account number, may be set, and the number thus set up can be compared with the number read from the ledger card to insure that the check or the deposit is being posted to the correct account. Failure of the numbers to agree will cause the card to be fed from the machine immediately and will prevent the data from being entered into the machine.

These automatic safeguards and checking means, together with the usual interlocks and controls, insure virtually "error-proof" operations without the necessity of running proofs on work already performed.

This machine is provided with a data storage means, in which the balance and the check count are stored when they are read and in which they are retained until it is determined that something has been read from each channel on the card and that there has been agreement between the account number read from the card and that set in the account number keyboard. If data was read from each channel on the card, and if the account numbers agree, then the balance and the check count are entered into the totalizer and the counter of the machine under control of the data storage means. If there is a failure to read data from any channel on the card, or if the account numbers do not agree, the card is immediately fed from the machine, as indicated above, and the balance and the check count are not entered into the totalizer and the counter of the machine. By thus storing the balance and the check count until it is determined that data has been read from all of the channels on the card, and until it is determined that there is agreement between the account numbers, incorrect entries and corrective operations of the machine are minimized.

This storage of balance and check count until the account number has been determined also enables a "stop payment" signal to be obtained to call the operator's attention to the fact that a "stop payment" order has been placed on the account and to enable the operator to examine the check, before the entries are made into the totalizer and the counter, to see whether it is the check upon which the "stop payment" was placed. This is accomplished by recording a "stop payment" number on the ledger card instead of the account number, so that the comparator mechanism will show a failure of comparison and will prevent the entry of the balance whenever it is attempted to post to the account in the usual manner. Upon verification that the check is not the one against which the "stop payment" order has been placed, it may be posted by setting the "stop payment" number in the comparator keyboard and operating the machine in the usual manner. In this manner, the posting of a check on which a "stop payment" order has been placed is prevented.

The accounting machine is also provided with extremely flexible controls which enable it to perform different types of operations involving reading and recording operations on the cards. For example, with one setting of the controls, the card-reading operation may be eliminated, and data may be set up on the keys of the machine and recorded magnetically on the card; with another setting of the controls, a normal posting operation may take place involving the reading of the card to pick up the old balance, the entering of checks and/or deposits by operating the machine under control of the keys, and the recording of the new balance on the card; with a further setting of the controls, the machine may be controlled to transfer certain stored data from one card to another, as at the end of the month or accounting period, and in this operation data is read from a card and set up in the machine, the old card is removed from the machine and a new card is put into the machine, and certain of the data which was read is recorded on the card; and, with a still further setting, the controls will be effected to cause the machine to operate in a trial balance operation, in which the stored data is read, the old balance and the check count are entered into the machine, and the card is ejected without erasure of the stored data or recording of any further data thereon.

For a more detailed description of the construction and operation of those parts of the accounting machine which do not form a part of the present invention, reference may be had to the previously-mentioned United States patent application, Serial No. 610,754.

Comparator keyboard

Mechanism to enable account numbers to be recorded on the ledger cards and to enable an account number to be set up for comparison with the account number on the ledger card is provided and includes a comparator keyboard 100, shown in Figs. 6, 10A, and 11. This keyboard is mounted on the accounting machine in its housing 101 in a position readily accessible to the machine operator. The keys of the comparator keyboard effect their control by the selective closing of circuits, and accordingly the comparator keyboard 100 is connected by a cable (not shown) to the various parts of the machine which are controlled thereby.

The keyboard contains three rows of keys 102, upon which an account number may be set for controlling the recording of the account number on the ledger card or for use in comparing the number of the account to which the entry pertains with the account number recorded on the ledger card.

The keys of each row are provided with stems 103 (Figs. 10A and 11), which slide in grooves 104 in a key-supporting block 105 of insulating material, and are held in place in the grooves by a plate 106 of a pair of cooperating contact supporting plates 106 and 107. Extending from one side of each key stem 103 is a stud 108, which cooperates with a spring 109 in a socket 110 in the block 105 to urge the key to undepressed position and also cooperates with a pair of latching slides 111 and 112, which are slidably mounted in a recess 113 in the block 105 and are effective to latch a key in depressed position and to release any previously depressed key upon depression of another key in the row. Extending from the other side of the key stem is a contact-closing button 114, of insulating material.

As shown in Fig. 10A, the slides 111 and 112 are of similar shape, having slots 115 adjacent each end to receive a pair of tie rods 116 and 117 and having alternating latching projections 118 and camming projections 119, but are reversed end for end when installed in the block 105, so that one of the slides has its latching projections 118 cooperating with the studs 108 on odd-numbered keys and has its camming projections 119 cooperating with the studs 108 on even-numbered keys, and the other of the slides has its latching projections 118 cooperating with the studs 108 on the even-numbered keys and has its camming projections 119 cooperating with the studs 108 on the odd-numbered keys. A spring 120, connected between studs on the slides 111 and 112, urges the slides in opposite directions to maintain the latching and camming projections in engagement with the studs 108 on the keys. Upon depression of the key (an odd-numbered key, for example), its stud 108, engaging the latching projection 118 of its related slide, will shift and slide and release any odd-numbered key which may have been latched into depressed position, and, at the same time, its stud 108 will engage the camming projection 119 on the other slide to release any even-numbered key which might have been latched in depressed position. Similarly, depression of any even-numbered key will cause any depressed key of the bank to be released. Simultaneous depression of both an odd-numbered key and an even-numbered key will release any previously depressed key and will prevent either of the keys from being latched, thereby clearing the bank of any setting of the keys.

The keys are held in the grooves 104 in the block 105 by the plate 106 of a contact-supporting assembly consisting of the two plates 106 and 107 (Figs. 10A and 11), of non-conducting material, which are riveted together by rivets such as 121, and held against the block 105 by the tie rods 116 and 117.

Clamped between the plates 106 and 107 by the rivets 121 is a common contact member 122, formed with a finger 123 opposite each of the key positions in the bank. The common contact member 122 is clamped between the plates 106 and 107 at such an angle that the fingers 123 (Fig. 11) lie in the path of movement of the contact-closing buttons 114 on the keys, which buttons 114 extend through slots 124 in the plate 106.

The plate 107 has a plurality of individual openings 125 located in registry with the fingers 123, said fingers being positioned within said openings. A plurality of individual contacts 126 are also located in the openings 125. These contacts are provided with terminals 127 and are secured, by means of rivets 129, to a supporting bar 128, made of insulating material, which is fixed to the machine framework. The common contact member 122 is also provided with a connector lug, and connections may be made to the terminals 127 and to said connector lug by wires in the cable which connects the comparator keyboard to the apparatus which it controls.

As is most clearly shown in Fig. 11, depression of a key will cause the contact-closing button 114 to move the finger 123 down to shift the lower end of the finger to the left into engagement with its related contact 126, which engagement will be maintained as long as the key remains latched in depressed position.

The tie rods 116 and 117 serve to clamp the blocks and contact-supporting assemblies for the three rows of keys together as a unit and also serve to secure them to supporting frames within the keyboard.

Comparator pickup and storage mechanism

The comparator mechanism also includes three differential mechanisms which are utilized to enable account numbers to be recorded on the ledger cards under control of the comparator keyboard, and also to set switching means to enable account numbers which are read from the card to be compared with account numbers set on the comparator keyboard. These differential mechanisms are similar, and, accordingly, the functioning of the three differential mechanisms will be clear from a description of one of them.

An arm 140 (Fig. 3) is pivoted on a shaft 139, which is supported in the machine framework, and said arm has a differential latch 141 pivoted at its lower end. The shaft 139 is rocked first counter-clockwise and then clockwise back to its normal position during certain operations of the machine, as described in the previously mentioned United States patent application, Serial No. 610,754. The latch 141 has a stud 142, which extends through a cam slot 143, formed in a toothed segment 144, also pivoted on the shaft 139. A spring 145, connected between the arm 140 and the segment 144, normally causes the stud 142 to occupy the left end of the cam slot 143, in which position the stud 142 is located in the path of movement of a driving surface 146 on a driving member 147, secured to the shaft 139. Counter-clockwise movement of the shaft 139 will impart similar movement to the driving member 147, which will in turn drive the arm 140 and the segment 144 with it as long as the stud 142 is opposite the driving surface 146.

The differential setting of the differential mechanism is controlled by a pawl 148, which has a hooked end, is pivoted on a stud in a locking plate 155, lies in the same plane as the segment 144, and is urged counter-clockwise by a spring 149. Normally, the hooked end of the pawl 148 will be retained out of engaging relation with the teeth on the segment 144 by a solenoid 150, which will thus retain the pawl until the solenoid is deenergized. When it is desired to arrest the differential mechanism, the solenoid will be deenergized in response to a signal from the ledger card or from the comparator keyboard 100, allowing the pawl 148 to rock counter-clockwise, causing the hook on the pawl 148 to engage the appropriate tooth on the segment 144 and thereby prevent further counter-clockwise movement of the segment. Continued movement of the differential latch 141 at this time causes the stud 142 to be moved to the right-hand end of the cam slot 143. The cam slot 143 is so shaped that, as the stud 142 moves to the right in the slot, said stud will be cammed outwardly, out of engagement with the driving surface 146 on the driving member 147 and into one of the locking notches on the locking plate 155. Continued movement of the driving member 147 will move a locking surface above the stud 142 to maintain the stud 142 in the notch in the plate 155 to lock the differential latch 141 and the arm 140 in set position. The differential mechanism may thus be set in any of the positions 0, 1, 2, 3, 4, 5, 6, 7, 8, and 9, in its counter-clockwise movement. In the return movement of the driving member 147, a stud 156 thereon will engage a surface on the differential latch 141 to return the latch clockwise, initial movement of the latch 141 causing the stud 142 to be cammed out of engagement with the notches in the plate 155. The camming of the stud 142 out of the notches in the plate 155 will move the stud inwardly and allow the spring 145 to move the segment 144 and the arm 140 until the stud 142 again is in the left end of the slot 143. Continued clockwise movement of the latch 141 will shift the arm 140 and the segment 144 to their home positions. The return movement of the segment 144 will cause the hooked end of the pawl to be cammed away from the segment far enough to be attracted by the solenoid 150, which will have been energized at this time.

Each comparator number differential mechanism controls the setting of a control plate 170, which is used to control the check-back circuit for checking the correctness of the setting of the differential mechanism with the account number recorded on the ledger card, is also used to control the recording of the account number on the ledger card in a data-recording operation, and is further used to control the switches which store the account number taken from the ledger card for comparison with each account number relating to individual item entries which is set into the comparator keyboard 100.

Mounted free on the shaft 139 (Fig. 3) is an arm 171, which has one of its free ends pivotally connected to the lower end of a link 172. The upper end of the link 172 is pivotally connected to the plate 170 by a connecting member 173. A surface 168 on the arm 171 is positioned in the path of movement of a roller 167 secured to the arm 140. Thus, as the arm 140 is moved counter-clockwise during machine operation, the roller 167 will move into engagement with the surface 168 on the arm 171 and will carry the arm 171 counter-clockwise about the shaft 139. The control plate 170 is pivotally mounted on a shaft 169, fixed in the machine framework, and is urged clockwise about the shaft 169 by a spring 175, extending between the member 173 and the plate 155, until a surface 176 on the plate 170 engages a stop 177, fixed in the machine framework, to locate the plate 170 in its zero position. It will be seen that movement of the arm 171 under influence of the roller 167 on the arm 140 is effective through the link 172 to position the plate 170, and that when counter-clockwise movement of the arm 140 is terminated by de-energization of the solenoid 150, as previously described, the plate 170 will be positioned in accordance with the position of the arm 140.

The control plate 170 is provided with a control surface 166, used in check-back and recording controls, as fully described in the previously mentioned United States patent application Serial No. 610,754, and is provided with a series of locking and aligning teeth 178, which cooperate with an aliner bar 179. The aliner bar 179 extends across the three comparator number differential mechanisms and is supported by arms 180 (only one of which is shown) connected by a sleeve and loose on a shaft 181, to which the aliners (not shown) for the other control plates of the accounting machine are secured. The arms 180 are fixed with respect to a further arm 182, also mounted on the shaft 181 and having a stud 183 fixed in its free end. This stud rides in a slot 184 in a link 185, and a spring 165 is connected between said stud and a stud 164 on the link 185 to form a flexible driving connection between the arm 182 and the link 185. Said link is urged downwardly, as viewed in Fig. 3, by a spring 190 and is connected to one arm of a bell crank 186, pivoted on a stud 187 in the framework of the accounting machine. On the other arm of the bell crank 186 is a cam follower 188, which is urged by the spring 190 into engagement with a cam 189 on an auxiliary cam shaft 163 of the accounting machine. The cam 189 is so shaped that the aliner 179 will be disengaged from the teeth in the control plates 170 after about fifteen degrees of rotation of the cam shaft 163, to enable the control plates to be set by the operation of the differential mechanism, and will be returned to locking and alining position at about 180 degrees to lock the control plate in position to control the check-bar and recording circuits.

In certain posting operations and recording operations, it is desired that the control plates 1530 which have been set in a previous operation be retained in position and not be released. A stud 200 (Figs. 3 and 7), eccentrically mounted on the link 185 to permit some adjustment of its position, is located to cooperate with a surface 201 on a lever 202 pivotally mounted on a machine frame member. Said lever is urged clockwise by a spring 203, secured to said lever and to the machine frame member, to urged said lever to a position in which the surface 201 is located out of locking relation to the stud 200. The lever 202 is connected to the armature 204 of a comparator aliner solenoid L8. When the solenoid L8 is energized, it moves the lever 202 counter-clockwise, as viewed in Fig. 7, so that the surface 201 is positioned beneath the stud 200, thus blocking downward movement of the link 185 and retaining the aliner 179 in operative position to hold the plate 170 against movement. The circuit for energizing the solenoid L8 and the circumstances under which it is used will be explained more fully when the circuit diagram is explained.

Associated with each comparator number differential mechanism is a switch assembly 211 (Figs. 1 and 2). The switch assembly is mounted on a supporting plate 212, fixed on cross bars 159 and 160, and includes a total of twenty contacts imbedded in an insulating plate 213, which is secured to the plate 212. Of these twenty contacts, ten, designated 214, are "live" contacts, which extend through the plate 213 and are provided with terminals 215. The other ten contacts, designated 216, are "dead" contacts, and are not provided with any terminal connections on the other side of the plate 213. The "dead" contacts 216 provide a continuity of wiping surface and, at the same time, prevent a wiper from engaging two adjacent "live" contacts 214 at the same time. A common 217, having a terminal 218, is also embedded in the plate 213.

Free on the shaft 139 and positioned in alinement with each plate 213 containing the contacts 214 and 216 is a bearing member 219, on which is mounted a wiper 220 having one contact 221 positioned to engage the contacts 214 and 216, and having another contact 222 positioned to engage the common 217. Adjustable securing means 223 are provided to connect the member 219 to an arm 224, which is secured by means of a stud 225 and a pair of spacing collars 226 to one end of the arm 171 (Figs. 1 and 3).

It will be seen that as the arm 171 (Fig. 3) is positioned by the auxiliary differential mechanism during a balance pickup operation, the arm 224 and the wiper 220 will be correspondingly positioned, so that the contact 221 on the wiper 220 engages a contact in the plate 213 which corresponds to the number picked up in that column from the ledger card during the balance pickup operation. It will also be seen that the switch position of the switch assembly 211 set by a balance pickup operation will be retained or stored during the following posting and/or recording operations, since the arm 171, to which the wiper 220 is connected through the arm 224, is held in the position corresponding to the number picked up during the balance pickup operation by means of its connection through the link 172 with the plate 170, which in turn is retained in position by the aliner 179, as previously described. The switch assembly 211 for each row or column of the comparator therefore serves as a memory or storage switch, since it retains the comparator number picked up during a balance pickup operation through the following posting and recording operations.

Also associated with the comparator number auxiliary differential mechanism is a second plurality of switch assemblies 231 (Figs. 1, 4, and 5). The two leftmost assemblies 231, as viewed in Fig. 1, are positioned adjacent each other, while the rightmost switch assembly 231 is spaced from the other two, but is similar in construction, although certain parts are used jointly by the leftmost two switch assemblies. As best seen in Fig. 4, the switch assembly 231 there shown is supported in position by a supporting plate 232, to which is connected an insulating plate 233, in which alternate "live" and "dead" contacts 235 and 236 are imbedded, as described in connection with the switch assemblies 211. A common 237 is also imbedded in the plate 233, and terminals 238 and 239 are provided for the individual "live" contacts and for the common, respectively.

A bearing member 240 is secured to the shaft 139 and has fixed thereto a wiper 241 provided with contacts 242 and 243 for engaging the contacts 235 and 236 and the common 237, respectively. It will be seen that, as the shaft 139 rotates during the machine operation, the wiper 241 is carried with it to engage the common 237 constantly and the contacts 235 and 236 serially. As best shown in Fig. 5, the supporting plate 232 and the bearing member 240 are utilized in common for the two leftmost switch assemblies 231. The three switch assemblies 231 are utilized in the recording of comparator numbers on a ledger card, and the manner in which they operate will be made clear in the description of the operating circuits embodied in the various circuit diagrams.

*Control row mechanism*

Figure 8:
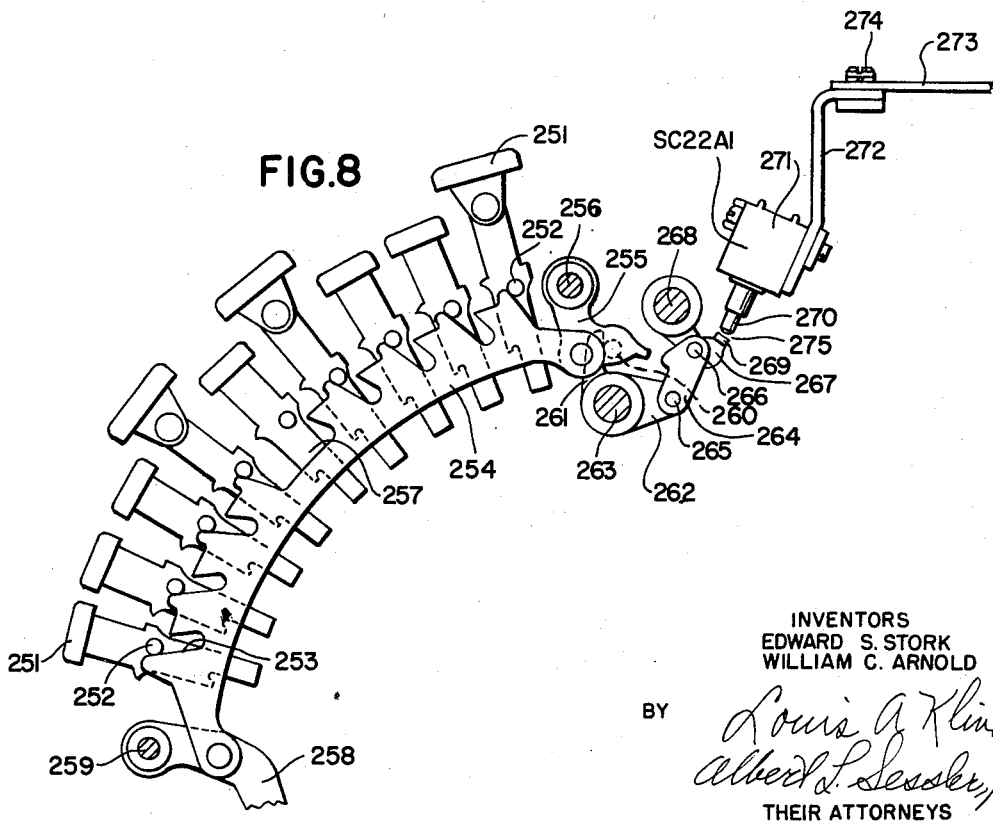
Fig. 8 is a detail view showing a control row of the accounting machine keyboard, and a switch controlled by depression of keys in said row.

Certain electrical controls of the accounting machine embodying the present invention are effected by operation of various keys in the control rows of the accounting machine keyboard. A portion of the mechanism of control row 2 of the keyboard of the accounting machine will accordingly be described, in order to relate the mechanical construction of the machine to the operation of the electrical circuitry described in the circuit diagrams of Figs. 16 to 19 inclusive. For a more detailed description of the control rows of the accounting machine embodying the present invention, reference may be had to the previously mentioned United States patent application Serial No. 610,754. Control row 2 of the keyboard and switches controlled by the depression of keys in said row are shown in Figs. 8 and 9 of the drawings. The keys 251 of row 2 are mounted in a key frame (not shown), and each key 251 carries a pin 252, adapted to cooperate with an associated slot 253 of a releasing bar 254 (Fig. 8) pivoted at its upper end to an arm 255, which in turn is pivoted at 256 on the key frame. The releasing bar 254 is notched at 257 to eliminate the slot for the "Overdraft" key to prevent this key from being able to release the machine. Associated with each of the keys 251 is a coil spring (not shown) which is adapted to maintain all the keys in their normal undepressed positions in a manner which is well known in the art. The releasing bar 254 is also pivoted at its lower end to an arm 258, pivoted in turn at 259 to the key frame. The releasing bar 254 is normally held in its upper position, as shown, by means of a torsion spring (not shown) which engages the arm 255 and urges said arm counter-clockwise about its pivot 256.

When any key 251 is moved into depressed position and latched in that position, the arm 255, by means of a pin 260 carried thereon, contacting a finger 261 on an arm 262 pivoted on a rod 263, rocks said arm 262 counter-clockwise, as viewed in Fig. 8. The arm 262 is connected to a link 264 by a pin 265. Said link is pivoted at 266 to an arm 267, pivoted in turn on the usual accounting machine release shaft 268, carried by the machine side frames.

The arm 267 has a bent-over lip 269, adapted to cooperate with a switch plunger 270, which operates contacts SC22A1 of a switch 271, supported on a bracket 272. The bracket 272 is carried by a machine frame brace 273 and is supported by means of screws 274.

When the keys 251 are in their normal, undepressed positions, there is a clearance 275 between the lip 269 and the end of the switch-operating plunger 270. Upon depression of any one of the keys 251 to release the machine, its pin 252, operating in a slot 253, moves the bar 254 downwardly, whereupon the arm 255 is rocked clockwise, and the pin 260 rocks the arm 262 counter-clockwise. This causes the link 264 to raise, thereby rocking the arm 267 counter-clockwise. At a certain point in the downward movement of the key 251, the retaining detent for row 2 (not shown), which has been moving downwardly in response to the movement of a cooperating pin on the stem of said key, moves back upwardly due to the movement of said cooperating pin past the shoulder on said retaining detent, thus retaining the depressed key in its depressed position.

The relationship of the parts at this time is such that just as the retaining detent latches the key 251 in its depressed position, the lip 269 touches the end of the switch-actuating plunger 270. Downward depressing movement of the key continues for a short distance subsequent to this time, whereupon the arm 267 is rocked still farther counter-clockwise to move the switch plunger 270 upwardly a distance sufficient to close the contacts SC22A1, which are normally in open condition. The depressed key 251 is then spring-urged slightly upwardly, as pressure upon it is released, to the limit of permissible movement determined by the retaining detent. The manner in which the contacts SC22A1 function in the operation of the accounting machine will be made clear in the description of the circuit diagrams of Figs. 16 to 19 inclusive.

The "Deposit" key 251A of row 2 is adapted to control an additional set of contacts, as shown in Fig. 9. A detent 280 is pivotally mounted on two arms 281 and 282, in turn pivoted at 256 and 259 to the key frame of row 2. The detent 280 is provided with a single cam surface 283 positioned in the path of movement of the pin 252 on the stem of the #4 or "Deposit" key of row 2. At it lower end, the detent 280 is provided with a slot 284, which receives a stud 285 fixed to one arm of a lever 286 pivoted at 287 to the machine framework. At its other end, the lever 286 is provided with a finger 288 adapted to cooperate with an actuator 289 of a switch 290 fixed on a bracket 291 secured to the machine framework. Operation of the actuator 289 is effective to open the normally closed contacts SC25B2 in the switch 290.

It will therefore be seen that when the "Deposit" key 251A of row 2 is depressed, the pin 252 on the stem of said key coacts with the surface 283 on the detent 280 to rock said detent downwardly and to the left, as viewed in Fig. 9. This is effective, through the slot 284 and the stud 285, to rock the lever 286 clockwise, thereby shifting the actuator 289 to open the normally closed contacts SC25B2 in the switch 290. The manner in which these contacts function in the operation of the accounting machine will be fully explained in the description of the circuit diagram of Fig. 17.

*Function control mechanism*

Means are provided to control the various operating circuits of the accounting machine to enable said machine to perform different types of operations involving the reading of data from the ledger card, the entry of items by the machine keyboard, and magnetic recording of data on the card.

These means, shown in Figs. 12 to 15 inclusive, include a rotatable setting knob 301, which is located on the right side of the machine near its rear. In the present embodiment, the knob 301 is arranged to be settable to any one of six positions to control the machine to perform the following types of operations: "Add," "Trial Balance," "Transfer," "Posting I," "Posting II," and "Install."

When the knob 301 is in "Add" position, the electronic pickup and storage circuits of the accounting machine are disabled, and the machine functions as an adding machine, in which individual amounts are indexed on the amount section of the keyboard and entered into the machine by depression of the appropriate control key.

When the knob 301 is in "Trial Balance" position, the machine can be controlled to read cards, enter the balance and the check count in the machine, and immediately feed the card back to starting position without any erasing or recording operation, thus enabling a total of the balances to be obtained without affecting the data stored on the card.

When it is desired to transfer the data for an account from one ledger card to another, as when carrying forward balances or preparing new ledger cards at the end of the month, the knob 301 can be set to its "Transfer" position to control the circuits so that the account number and the balance can be read from the old card and stored in the machine, without carrying forward the check count and the line number. The old card can then be removed from the machine and a new card placed in the machine, and thereafter, in a new balance operation, the account number and the balance can be recorded on the new card along with zeros for the check count and line-finding position one for controlling the automatic line-finding mechanism.

With the knob 301 set "Posting I" position, the machine is controlled to pick up the old balance, the account number, and related data from the ledger card, and to record the new balance thereon magnetically on a new balance operation after check and/or deposit amounts have been entered into the machine by use of the keyboard. In this position of the knob 301, the account number picked up from the ledger card is compared with a number taken from the first item to be posted, either check or deposit, and indexed in the comparator keyboard. The two numbers must be identical in order for the pickup operation to be completed. However, the account numbers of additional items posted to the account are not compared by the machine with the account number picked up from the ledger card.

With the knob 301 set in "Posting II" position, the accounting machine functions to perform pickup, posting, and new balance operations in a manner similar to that described in connection with the "Posting I" position. However, with the knob 301 in the "Posting II" position, and with an additional manually-operated control in a first position, an account number comparison with the ledger card account number will be made for every item posted, both check and deposit. Alternatively, and with the additional manually-operated control in a second position, the comparison may be made only for the first item posted, either check or deposit, plus all additional deposit items. This latter procedure may be desirable from the standpoint of greater savings in time, since other means are available in many accounting systems for insuring that checks have been posted to the correct account.

Finally, when the knob 301 is in "Install" position, the machine is controlled to record data magnetically on the ledger card under control of the keyboard. In this type of operation, the reading circuit and certain of the checking circuits are disabled.

The knob 301 is secured to a short shaft 302, journaled for rotation in a side frame 303 and an a plate 304, secured in spaced relation to the frame 303. The reduced inner end 305 of the shaft 302 is slotted to engage a rotor shaft 306 of a multi-level wafer switch 307, only four levels of which are shown in Fig. 14. The shaft 302 has mounted thereon a retaining clip 308, which cooperates with the plate 304 to maintain the shaft 302 in engagement with the rotor shaft 306. The levels of the wafer shaft are so wired that the necessary contacts will be opened and closed in the control circuits in different positions of the knob 301 to enable the required controls to be obtained, as will be explained more fully when the circuits are described.

One of the levels of the switch 307 is seen in the sectional view of Fig. 15. A plurality of supporting plates 309 for the switch 307 are mounted on a pair of rods 310 and 311, which inturn are supported in the frame 303 and a further frame member 312. Secured to the plates 309 are a pair of rods 313 and 314, on which are secured a plurality of annular insulating base plates 315 for the various levels of the switch 307. Spacers 316 on the rods 313 and 314 maintain the plates 315 in the desired spaced-apart relationship. Disposed within each of the annular plates 315 is a circular rotor 317, fixed to the shaft 306 and containing a pair of contacts 318, which extend through the rotor from one side to the other.

Disposed on one side of the plate 315 in overlapping relation to the rotor 317 are a plurality of contacts 319, having terminals 320, to which appropriate lead wires may be connected. Disposed on the other side of the plate 315 in similar overlapping relationship to the rotor 317 are a pair of arcuate commons 321, having terminals 322 integral therewith for attachment to appropriate lead wires of the circuit. A cover plate 323 is positioned over the commons 321 to maintain them in proper position.

It will be seen that the contacts 318 in the rotor 317 complete a circuit between the commons 321 and selected ones of the contacts 319, depending upon the position of the rotor 317. Therefore, by rotation of the knob 301, a plurality of circuits extending through the contacts of the switch 307 may be interrupted or completed for accomplishment of the desired function as determined by the position of the knob 301.

The shaft 302 has mounted thereon a plate 331, which is formed with a series of shallow detent notches 332. A lever 333 is pivoted on the frame 303 and is urged by a spring 334 to maintain a stud 335 on the lever 333 in cooperation with the detent notches 332 to locate the knob 301 in any of its several control positions.

The plate 331 is also provided with a series of deeper notches 336, into which a stud 337 on a lever 338 may enter to lock the shaft 302 against accidental movement. The lever 338 is pivoted on a stud 339 on the frame 303 and is urged clockwise by a spring 340 to maintain the stud 337 in the locking notches 336 in the plate. The lever 338 can be rocked counter-clockwise to move the stud 337 out of the notches 336 when it is desired to change the setting of the function control means. In order to accomplish this, the lever 338 is provided with an upwardly-extending arm 341, having therein a stud 342, which pivotally connects the lever 338 with the rear end of a link 343. The forward end of the link 343 is pivotally connected to an arm 344, secured to a stud shaft 345, journaled in a supporting frame member. Also secured to the stub shaft 345 is the usual key release lever 346, which carries the usual key release knob 347 at its outer end. When the lever 346 is rocked counter-clockwise in the usual manner to release any keys which may be depressed, it will rock the shaft 345 and the arm 344 to move the link 343 to the left. The leftward movement of the link 343 rocks the lever 338 to release the shaft 302 for movement to change the setting of the function control means.

Means controlled by the setting of the function control mechanism are provided for causing the keys 102 of the comparator keyboard 100 to be released after each check or deposit entry when the knob 301 is located in "Posting II" position. These means are shown in Figs. 6, 10A, 10B, and 14.

A shaft 361, which is journaled in the frame member 312, is slotted at one end to receive an end of the rotor shaft 306, and turns with the shaft 306. A cam 362 (Figs. 10B and 14) is fixed on the shaft 361 to rotate with said shaft.

The peripheral surface of the cam 362 cooperates with a follower 363 fixed adjacent one end of a link 364. Said link is provided at said one end with a slot 365, which receives the shaft 361 for support of said link. The link 364 is connected at its other end to an arm 366 by means of a slot 367 in said link, which cooperates with a stud 368 in the arm 366. A spring 369 urges the link 364 to the right, as viewed in Figs. 10A and 10B.

The arm 366 is secured to a lever 370 free on a shaft 371 journaled in the machine framework. The shaft 371 is controlled by other mechanism of the accounting machine to partake of regular counter-clockwise rocking movement and subsequent return clockwise to the position shown in Fig. 10A. An arm 372, secured to the shaft 371, is flexibly connected by a spring 373 to the lever 370 to urge said lever to follow the movement of the shaft 371 and the arm 372. A stud 374 in the arm 372 cooperates with a shoulder 375 on the lever 370 to provide positive means for returning the lever 370 to the position shown in Fig. 10A when it has followed the counter-clockwise movement of the shaft 371 and the arm 372.

At one end, the lever 370 is provided with a finger 376, which is positioned to feel for notches or low spots such as 377 in a disc 378, which is set under control of the control row 2 of the accounting machine in a manner described in the previously mentioned United States patent application Serial No. 610,754, and in the United States patent to Pascal Spurlino et al. No. 2,373,510.

At its other end, the lever 370 is provided with an arm 379, which is connected by means of a link 380 to a pitman 381 near one end of said pitman. At its other end, the pitman 381 is pivotally connected to a lever 382, pivoted at 383 to the machine framework, and provided with two cam followers 384 and 385, which cooperate with cams 386 and 387, respectively, both of which cams are secured to the printer cam shaft 388 of the accounting machine.

The pitman 381 is provided with a notch 389 at its end adjacent the connection with the link 380. The notch 389 is positioned to be engageable with a shaft 390, which extends between and is secured to a lever 391 mounted at 392 in the machine framework and a link 393 pivotally connected to an arm 394, which in turn is secured to a shaft 395. The lever 391 is provided with an extension 396, which is arranged to engage a stop 397 to limit movement in a clockwise direction, as viewed in Fig. 10A, of the lever 391. The shaft 395 is journaled in frame members 398 and 399 (Fig. 6) and has also secured thereto a plurality of fingers 400.

A surface 401 at the end of each finger 400 is positioned to engage a stud 402 secured in the lower end of a sliding member 403, resembling the stem of a manually depressible key. One member 403 is provided for each row or bank of the comparator keyboard 100 and is slidably mounted in the block 105 for each of said rows. A second stud 404, fixed in each of the members 403, is arranged in engagement with cooperating cam surfaces 405 and 406 of the latching slides 111 and 112, respectively, of each row of the comparator keyboard 100. It will be seen that downward movement of the members 403 will act through the studs 404 and the cooperating surfaces 405 and 406 to move the latching slides 111 and 112 away from each other and thereby release any depressed keys in the three rows of the comparator keyboard.

The manner in which the key release mechanism described above functions will now be explained. When the various parts are positioned as shown in Figs. 10A and 10B, the counter-clockwise rocking of the shaft 371 will cause the finger 376 at one end of the lever 370 to move into engagement with a notch 377 on the disc 378. This acts through the link 380 to lower the pitman 381, so that the notch 389 of said pitman engages the shaft 390 connecting the lever 391 and the link 393. Then, when the printer cam shaft 388 of the accounting machine rotates in its normal manner, the cams 386 and 387 act through the cam followers 384 and 385 to impart a movement to the right, as shown in Figs. 10A and 10B, to the pitman 381. Since the pitman 381 is engaged through the shaft 390 and the link 393 to the arm 394, this movement is transmitted to the shaft 395 and the fingers 400, causing said fingers to rock counter-clockwise, as viewed in Fig. 10A, so that their surfaces 401 engage the studs 402 at the lower end of the members 403 and carry said members downwardly, thereby causing the studs 404 on said members to separate the latching slides 111 and 112 to release any depressed keys 102 in the keyboard 100. In the event that the function control knob 301 is not in "Posting II" position, the cam 362 will have been rotated to a position in which the link 364 is moved to the left by coaction of the periphery of the cam 362 with the follower 363. In this event, the rightmost edge of the slot 367 will prevent counter-clockwise movement of the arm 366 and will thereby prevent sensing movement by the finger 376 on the lever 370 for notches such as 377 on the disc 378. The lever 370 will therefore be retained in the position in which it is shown in Fig. 10A, and this will, through the link 380, hold the pitman 381 in the position shown in Fig. 10A, in which the notch 389 is out of engagement with the shaft 390. In this event, the regular movement to the right and return of the pitman 381 under control of the cams 386 and 387 on the cam shaft 388 will be merely an idle movement and will not cause rocking of the shaft 395 or of the fingers 400.

In a similar manner, positioning of the disc 378 under control of row 2 of the accounting machine may prevent operation of the key release mechanism. Depression of certain keys of this row not normally used in a posting operation positions the disc 378 so that high spots on said disc are located opposite the finger 376. In such event, the finger 376 engages a high surface and prevents the lever 370 from rocking counter-clockwise a sufficient distance to lower the notch 389 thereon into engagement with the shaft 390, which is connected through the link 393 to the arm 394. Subsequent movement of the pitman 381 is then merely an idle one, and the depressed keys 102 of the comparator keyboard 100 are not released.

*Operating circuitry*

The various operating circuits which form a part of the illustrated embodiment of the present invention are shown in Figs. 16 to 19 inclusive. Only so much of the conventional circuitry of the accounting machine in which the present invention is embodied as is necessary to an understanding of said invention is shown. For a detailed description of other parts of the operating circuitry of the accounting machine, reference may be had to the previously mentioned United States patent application, Serial No. 610,754.

Referring now to Fig. 18, there is shown an energizing circuit for three relays K313, K314, and K320. These relays are connected in parallel combination, in series with a switching means designated 421, between two terminals 422 and 423. The terminals 422 and 423 are connected across a suitable source of 110 volts A.C. 60-cycle power. The switching means 421 represents certain switch contacts (not shown) in the accounting machine operating circuit which close about halfway through a "new balance" cycle of operation of the accounting machine and remain closed until the end of such operation, at which time they reopen. It will accordingly be seen that the relays K313, K314, and K320 energize during a "new balance" cycle of operation of the accounting machine and deenergize at the end of the "new balance" cycle of operation of the accounting machine. The manner in which these relays function in the operation of the remainder of the circuitry of the present invention will be described subsequently.

It will be recalled that the account number keyboard 100 (Fig. 6) contains three rows of keys 102, and that a common contact member 122, associated with each row of keys is provided with a plurality of fingers 123, which may be cammed to engage individual contacts 126 by depression of any one of several keys of a row. The common 122 and the individual contacts 126 for the three rows are shown diagrammatically in Fig. 16. As explained previously, each comparator differential mechanism (Fig. 3) has associated therewith a switch assembly 211, which has ten equally spaced contacts 214 thereon. As shown in Fig. 16, each of the contacts 214 is electrically connected to a corresponding contact 126 over a path 425. The wiper 220 of each switch assembly 211 is set according to the setting of the comparator differential mechanism under control of data read from the ledger card.

That portion of the circuitry of Fig. 16 utilized for comparing the account number as read from a ledger card in a balance pickup operation with the account number set up on the keyboard 100 will be considered first. At the beginning of a balance pickup operation, the switching means, diagrammatically represented at 421 in Fig. 18, is not closed, and consequently the relays K313, K314, and K320 are not energized. Therefore the various relay contacts shown in Fig. 16 which are controlled by the relays K313 and K314 remain in the position in which they are shown.

During the insweep of the ledger card, the comparator differential mechanisms are set according to the account number read from the card. These differential mechanisms will cause wipers 220, in the various switch assemblies 211, to be positioned on their contacts 214 according to the account number read from the corresponding channel of the ledger card.

Previous to initiation of the balance pickup operation, the keys 102 in the keyboard 100 corresponding to a three-digit account number are depressed to move fingers 123 into engagement with their related individual contacts 126. An examination of Fig. 16 will show that the common contact member 122 for any denominational order of the comparator mechanism is connected to its related wiper 220 only if said wiper has been positioned to a contact 214 corresponding to the value of the key 102 depressed.

The circuit of Fig. 16 is connected to a source of 110 volts A.C. 60-cycle power over the terminals 426 and 427. When all three of the wipers 220 are positioned to a contact 214 which corresponds to the key 102 depressed in the corresponding row of the keyboard 100, a circuit is completed from the terminal 426 over a line 428, the normally closed contacts K314B3, the wiper 220 and contact 214 of the first order switch assembly 211, the contact 126 corresponding to the key depressed in the first row of the keyboard 100, the common 122, a lead 429, the corresponding keyboard-controlled switches and differential-controlled switches for the second order of the comparator, the normally closed contacts K314BC2, leads 430 and 431, the corresponding keyboard-controlled switch and differential-controlled switch for the third order of the comparator, the normally closed contacts K314B4, a lead 432, and the relay K318 to the other terminal 427 of the circuit of Fig. 16. This results in the energization of the relay K318. The manner in which the relay K318 functions in the operating circuitry of the present invention will be subsequently described.

It will be seen that if, in any order of the comparator, the number indexed into the keyboard 100 by depression of one of the keys 102 does not correspond to the number picked up from the ledger card during its insweep, said number controlling the positioning of the wiper 220 of that order, then the circuit described above will not be completed, and the relay K318 will not be energized. This circuit therefore provides effective means of comparing the three-digit number indexed on the comparator keyboard 100 with the corresponding number picked up from the ledger card during its insweep.

In certain instances, it is desirable to cause the relay K318 to be energized even though a comparison of the account number on the keyboard and the account number on the card has not been effected. For this purpose, additional control circuits, which by-pass the comparison circuitry, are provided and will be explained below.

A first such circuit extends between the terminal 426 and a point 443 adjacent the relay K318, and includes a multiple-position switch 445, which is controlled by the function control knob 301. Two terminals 447 and 448 of the multiple-position switch 445 are connected by conductors 449 and 450, respectively, to the point 443 in the energizing circuit for the relay K318. The terminal 447 corresponds to the "Trial Balance" position of the function control knob 301, while the terminal 448 corresponds to the "Transfer" position of the knob 301. It will therefore be seen that when the function control knob 301 is positioned in either the "Trial Balance" position or the "Transfer" position, the relay K318 will be energized without completion of the comparison circuit of Fig. 16.

In a similar manner, two switches 451 and 452 are connected in parallel combination between the terminal 426 and the point 443 in the energizing circuit of the relay K318. The switch 451 is a push-button-type switch located on the accounting machine keyboard, while the switch 452 is a key-operated switch located on the keyboard of the accounting machine. It will be seen that the closing of either of these two switches results in completion of a circuit between terminal 426 and point 443, and thereby by-passes the comparison circuit of Fig. 16. The switch 451 is known as the "Disable Comparison" switch and is used by the operator when it is desired to disable the comparison feature of the accounting machine during its operation. The switch 452 is known as the "Lock Disable Comparison" switch and may be closed by key-controlled means to disable the comparator mechanism of the accounting machine for extended periods, when such is deemed desirable.

The circuit included in Fig. 16 for controlling the setting of the comparator differential mechanism under control of the comparator keyboard 100 to enable account numbers to be recorded on the ledger card will now be described. This control is utilized in a recording operation following a new balance operation of the machine and is effective either to control the initial recording of an account number on the card or to change an account number previously recorded on the card.

It will be recalled that in a new balance operation the switching means 421 (Fig. 18) is closed, to cause energization of the relays K313, K314, andn K320. This operates relay contacts in the circuit of Fig. 16 as follows: The contacts K313A1, K313A2, K313A3, K314AC2, and K314A4 are closed; and the contacts K314BC2, K314B3, and K314B4 are opened. This has the effect of interrupting the comparison circuit described above, and of preparing a control circuit which is connected to a source of minus 75 volts D.C. power at the terminal 435.

As previously described, three switch units 231 (Fig. 4) are provided in the accounting machine, and the wipers 241 of said switch units are connected to the shaft 139 for rotation therewith. Each of the switch units 231 is provided with ten contacts 235 arranged for sequential engagement by the contact 242 on the wiper 241. The contacts 235 and the wiper 241 are shown diagrammatically in Fig. 16.

The keys corresponding to the several digits of the account number are depressed in the key banks of the keyboard 100 and cause their related contacts 126 to engage the common 122 for each bank. The closure of the contacts by the keys will apply minus 75 volts from the terminal 435 over the now-closed contacts K314A4 and K314AC2 to the commons 122 for the three key banks, thence through the contact 126 in each bank corresponding to the depressed key 102, and over conductors 436 to the corresponding contacts 235 of the switch assemblies 231.

As the comparator differential mechanisms are driven by the driving members 147 (Fig. 3), the wipers 241 of the switch units 231 move over the contacts 235 in synchronism, and, when a wiper engages a contact 235 which is at minus 75 volts due to the engagement of a contact 126 with a common 122 under influence of one of the keys 102 in each row of the comparator keyboard 100, the minus 75 volts will be applied over the now-closed relay contacts K313A1, K313A2, and K313A3, and over conductors 437, 438, or 439 to points 440, 441, and 442 in the related operating circuit for the corresponding bank. This application of minus 75 volts to the points 440, 441, or 442 is effective, through means fully disclosed in the previously mentioned United States patent application Serial No. 610,754, to deenergize the solenoid 150 for the corresponding differential mechanism to release the related pawl 148 (Fig. 3) to arrest further movement of the differential mechanism. In this manner, the differential mechanisms are set according to the digits set up on the keyboard 100. As explained earlier, the setting of the comparator differential mechanism positions the check-back and recording control plates 170 associated with these differential mechanisms, and these plates are used to control the recording of the account number on the card, in a manner which is fully explained in the previously cited United States patent application Serial No. 610,754.

Shown in Fig. 17 is the energizing circuit for the accounting machine trip relay K307. A source of 110 volts A.C. 60-cycle power is applied to this circuit over the terminals 461 and 462. A switch means 463 is located in the circuit between the terminal 461 and a point 464, and represents a plurality of interlocks with insure that the accounting machine is in proper condition to commence an operation, which operation may be of any type except a pickup operation.

A plurality of parallel circuit paths are connected between the point 464 and a point 465 adjacent to relay K307. A first one of these paths, extending between the points 464 and 465, includes the contacts K307A1, controlled by the relay K307. It will be seen that energization of the relay K307 over another circuit path closes the contact K307A1 to complete this path and to thereby provide a holding circuit to maintain the relay K307 in an energized condition. This holding circuit is interrupted at a predetermined time in the operating cycle of the accounting machine by the opening of a switch included in the interlock switching means diagrammatically shown at 463.

Another path over which the relay K307 may be energized extends from the point 464 to a point 466 on a first conductor 467, over contacts SP3A1, a second conductor 468, one of two sets of contacts SC5B1 and SC16A1 arranged in parallel, a point 469, and the contacts SC22A1 in series with the parallel combination of contacts SC5B1 and SC16A1, to the point 465. The contacts SP3A1 are controlled manually from a push-button-type switch on the accounting machine keyboard and are used when it is desired to "remake" a ledger card; that is, to create a new ledger card bearing all information contained on an old ledger card which has been damaged or otherwise rendered unfit for use with the accounting machine. The contacts SC5B1 are machine-controlled normally closed contacts which open when the available printing area on a ledger card has been exhausted, in order to prevent improper printing on said card. The contacts SC16A1 are normally open contacts which are closed by depression of the Analysis key on the accounting machine keyboard to by-pass the contacts SC5B1, since an Analysis operation may properly be performed by the accounting machine even when the normal capacity of the ledger card has been reached. As previously described, the contacts SC22A1 (Figs. 6 and 17) are normally open, and are closed by depression of any row 2 control key except the Overdraft key.

An additional energizing path for the relay K307 extends from the terminal 461 over the switch means 463, the point 464, the point 466 on the conductor 467, and contacts SC4A1 to the conductor 468, and then to the terminal 462 over the same path described above. The contacts SC4A1 are normally open, and are closed by depression of the Clear Total or Sub-Total control keys on the accounting machine keyboard.

Further energizing paths for the relay K307 extend through various contacts of a switch 471 controlled by the function control mechanism, which, it will be recalled, may be set in any desired position by use of the function control knob 301. The wiper 470 of the switch 471 is connected to a point 472 on the conductor 467. Contacts 473 and 474 of the switch 471, corresponding to the "Add" and "Install" positions of the function control knob 301, are connected to points 476 and 477, respectively, on the conductor 468. Contact 475 of the switch 471, corresponding to the "Posting I" position of the function control knob 301, is connected to a conductor 478. A point 479 on the conductor 478 is connected to a point 480 on the conductor 468 over normally closed contacts SC11B1, which are controlled by the step cam of the accounting machine to open when the ledger card is positioned in the accounting machine to its "Zero Line" position, in order to prevent any posting operation from being recorded in the "Zero Line" of the accounting machine.

It will therefore be seen that when the function control knob 301 is set to "Add" or "Install" position, an energizing path for the relay K307 may be completed from the terminal 461 over the switch means 463, the point 464, the points 466 and 471 on the conductor 467, the wiper 470 of the switch 471, either contact 473 and point 476 on the conductor 468, or contact 474 and point 477 on the conductor 468, and then to the terminal 462 over the path previously described. When the function control knob 301 is set to "Posting I" position, the path is the same as the above to the wiper 470, and then extends over the contact 475, the conductor 478, the point 479, the contacts SC11B1, the point 480 on the conductor 468, and is completed over the previously described path to the terminal 462.

Another path for energization of the relay K307 extends between the conductors 467 and 468 and includes the normally open contacts K318A1. It will be recalled that the relay K318 is shown in Fig. 16, together with various circuit paths for energization of said relay. When the relay K318 is energized, the contacts K318A1 (Fig. 17) are closed in the energizing path described above for the relay K307.

A similar path for energization of the relay K307 extends between the conductors 467 and 478 and includes the normally open contacts K315A2. These contacts are closed by energization of the comparator input relay K315, which may be energized by depression of a manually-operable push button on the accounting machine keyboard to close a switch in the energizing circuit for the relay K315. This push button is used in operations in which data is indexed manually into the accounting machine keyboard, rather than being picked up from magnetic coding on the ledger card.

A further path for energization of the relay K307 extends between the conductors 467 and 478 and includes a normally closed switch 481 and the normally closed contacts SC25B2. It will be recalled that the contacts SC25B2 are controlled by the row 2 "Deposit" key and are caused to open when said key is depressed. The switch 481 is a key-operated switch located on the accounting machine keyboard and may be set to open position by proper setting of the key which controls it, when it is desired to require that the account number of every check, as well as every deposit, posted, be compared with the account number magnetically coded on the ledger card, The energizing circuit for the comparator aliner solenoid L8 is shown in Fig. 19. This circuit extends between two terminals 485 and 486, which may be connected to a source of 110 volts A.C. 60-cycle power, and includes, in series, the solenoid L8, contacts 487, a multiple-position switch 488, contacts K320A1, and contacts K315BC1. Completion of the circuit of Fig. 19 through the contacts and the switch described above results in the energization of the solenoid L8. The contacts 487 are controlled by the accounting machine and perform a timing function in the circuit. The multiple-position switch 488 is controlled by the function control knob 301 and is connected into the circuit of Fig. 19 in such manner that the solenoid L8 may be energized in every position of the knob 301 except "Install." The normally open contacts K320A1 are controlled by the relay K320 (Fig. 18), which, as has been described, is energized to close said contacts only in new balance operations of the accounting machine. The normally closed contacts K315BC1 are controlled by the comparator input relay K315, which, it will be recalled, is energized during a manual input operation. In such event, the contacts K315BC1 are open to interrupt the energizing circuit for the solenoid L8.

The function of the solenoid L8 when energized is to shift the surface 201 (Fig. 7) of the lever 202 into blocking relation with the stud 200 on the link 185 during new balance operations to prevent the aliner bar 179 (Fig. 3) from dropping out of engagement with the teeth 178 on the plates 170. This maintains the plates 170 in the position in which they are set according to the account number picked up from the ledger card, and prevents this information from being lost.

When the function control knob 301 is in "Install" position and data is being manually entered on a card, it is not desired to lock the plates 170 against movement to retain the information thus stored, and therefore the circuit of Fig. 19 is interrupted by the switch 488 when the knob 301 is in "Install" position.

Similarly, when a manual input operation on the card is taking place, it is not desired to lock the plates 170 against movement to retain the information thus stored. Therefore the contacts K315BC1 controlled by the comparator input relay K315 open to interrupt the energizing circuit for the solenoid L8.

*Operation*

A typical series of accounting machine operations used in the processing or posting of accounts will now be described, in order to explain more clearly the manner in which the novel comparator means of the present invention functions. For the posting of an account, the function control knob 301 is set to either "Posting I" or "Posting II" position, depending upon the type of comparator control desired.

The first operation to be performed by an accounting machine in the normal processing of an account is a balance pickup operation. Such an operation is initiated by proper placement of a ledger card on the carriage table of the machine, indexing on the comparator keyboard 100 of the account number from the first check or deposit to be posted, and depression of the pickup bar of the accounting machine. The pickup from the ledger card of an account number which corresponds to the number indexed in the comparator keyboard 100 is effective to trip an operating shaft in the machine over an operating circuit, not shown herein, to initiate operation of the machine for storage of the amount and other information from the card in the machine, provided that the pickup from the card has been properly made, and that no keys in the accounting machine keyboard were depressed at the time the pickup was made.

After the pickup operation has been completed, posting of check and deposit items may begin. If the function control knob 301 has been set in "Posting I" position, the comparator mechanism will function to compare the account number picked up from the card with only the account number taken from the first posted item, either check or deposit, indexed on the comparator keyboard 100. Also the keys 102 of the comparator keyboard 100 will not be released at the end of each item posting operation of the accounting machine. It may thus be seen that the comparator operation which takes place when the function control knob 301 is in "Posting I" position is the same as the comparator operation in the accounting machine disclosed and claimed in the previously mentioned United States patent application Serial No. 610,754.

If the function control knob 301 has been set in "Posting II" position, the comparator mechanism will function to compare the account number picked up from the card with the account number taken from the first posted item and indexed on the comparator keyboard. Also a comparison is made for every additional deposit and, if desired, for every additional check as well. For an explanation of the manner in which this is accomplished, reference may be had to the previously described circuit diagram of Fig. 17, in which the wiper 470 of the switch 471 controlled by the function control knob 301 is shown positioned to the location in which it is when the knob 301 is in "Posting II" position. It will be seen that with the wiper 470 in the position shown, no circuit may be completed through the various contacts forming a part of the multiple-position switch 471. The energizing circuit for the relay K307 is then required to be completed through other sets of contacts, as will be explained.

It will be recalled that when a comparison is made correctly, the relay K318 is energized over the comparator circuit shown in Fig. 16, and that when no comparison, or an incorrect comparison, is made, the relay K318 remains deenergized. This relay controls the relay contacts K318A1 of Fig. 17, and it is therefore seen that when the relay K318 is energized, the contacts K318A1 are closed to complete the circuit between the conductor 467 and the conductor 478. In parallel with the contacts K318A1 and extending between the conductors 467 and 478 are the pair of series-connected contacts 481 and SC25B2, both of which are normally closed. The contacts SC25B2, as has been previously described, are controlled by operation of the row 2 "Deposit" key and are opened when said key is depressed. When the contacts SC25B2 are closed—that is, when the "Deposit" key is not depressed—it will be seen that said contacts in combination with the contacts 481, when the latter are closed, by-pass the relay-controlled contacts K318A1. The effect of this circuit arrangement is to eliminate the requirement for a comparator operation when the "Check" key of rod 2 is depressed, but to make a comparator operation mandatory when the "Deposit" key of the same row is depressed, since, when the "Deposit" key is depressed the contacts SC25B2 are opened, and the contacts K318A1 must then be closed in order to complete the circuit between the conductors 467 and 478 to energize the relay K307 and thus initiate an operation of the accounting machine.

In the event that it is desired to require a comparison for every item, be it check or deposit, the contacts 481 of Fig. 17 may be opened, thus interrupting the circuit branch which also contains the contacts SC25B2. The energizing circuit for the relay K307 must then be completed either over the contacts K318A1 under control of the comparator relay K318, or by closing of the contacts K315A2, which are controlled by the comparator input relay to be closed whenever it is desired to store a new comparator number on the ledger card. It is also noted that when the function control knob 301 is in "Posting II" position, the cam 362 (Fig. 10B) i positioned so that the keys 102 of the comparator keyboard 100 (Fig. 10A) are restored after each check or deposit operation, in the manner previously described. This is in contrast to the setting of the knob 301 in the "Posting I" position, in which the cam 362 is positioned to prevent restoration of the keys 102 on the keyboard 100 after each check or deposit operation.

After all of the individual checks and deposits have been posted, a new balance operation is made to complete the processing of the account. Initiation of a new balance operation causes the contacts 421 (Fig. 18) to close, thereby energizing the relays K313, K314, and K320.

As previously explained, energization of the relay K320 causes the plates 170 to be retained in their set positions during a new balance operation, so that the number picked up from the card in the preceding balance pickup operation can subsequently be recorded on the ledger card at the close of the new balance operation. All magnetic recording operations are made under the control of the plates 170, in the manner described in the previously mentioned United States patent application Serial No. 610,754.

Energization of the relays K313 and K314 opens certain contacts controlled thereby and closes others to interrupt the comparator circuits in the circuit diagram of Fig. 16, and to prepare the necessary circuits for effecting storage on the ledger card of a new comparator number under control of the comparator keyboard 100.

As previously described, the indexing of a comparator number in the keyboard 100 causes a contact 126 in each bank of the keyboard to engage the common 122 for that bank, so that minus 75 volts potential is applied to the corresponding contact 235 of the switch assembly 231 from the terminal 435. Subsequently, as the shaft 139 (Fig. 4) is moved counter-clockwise in unison with the movement of the carriage table holding the ledger card upon which the account number is to be stored, the wipers 241 of the various switch assemblies 231 for the different orders of the comparator mechanism wipe serially across the contacts 235 in each bank. When the wiper 241 for each bank engages the contact 235 of that bank to which potential has been applied from the terminal 435 over the common 122 and the selected contact 126, potential is applied through said wiper and the now-closed contacts econtrolled by the relay K313 to the three points 440, 441, 442 corresponding to the various orders of the comparator, thereby de-energizing the corresponding solenoid 150 to stop the auxiliary differential mechanism in a position corresponding to the number set in the keyboard 100 for that order. The plates 170 for the various orders are positioned according to the setting of the corresponding auxiliary differential mechanisms, so that the recording of the new comparator number on the ledger card may take place in the manner described in the previously mentioned United States patent application Serial No. 610,754.

Although the operations described above are only a few of the many which may be performed by an accounting machine utilizing the present invention, it is considered that this description, taken together with the description of the construction of the novel comparator mechanism of the present invention, is sufficient for a clear understanding of the invention.

While the form of mechanism shown and described herein is admirably adapted to fulfill the objects primarily stated, it is to be understood that it is not intended to confine the invention to the one form or embodiment disclosed herein, for it is susceptible of embodiment in various other forms within the scope of the appended claims.

What is claimed is:

1. In a machine of the class described, capable of performing accounting operations, said machine having means to sense a control number and a balance from a ledger card and also having means to perform item entry operations, the combination comprising storage means controlled by the control number sensing means, settable according to the control number sensed from the ledger card and capable of maintaining its position until another control number is read from another ledger card; first multiple-position switching means controlled by the storage means; a control number keyboard including keys on which a control number may be set in conjunction with each entry of further information; second switching means controlled by the control number set-up means; a comparing circuit interconnecting the first and second switching means for comparing the control number as read from the card with the control number set in the set-up means; means to initiate an item entry operation of the machine for entering said further information; disabling means for the initiating means controlled by the comparing circuit to disable the initiating means unless the first and second switching means correspond; manually operable function control means settable to determine the item entry operations in which control number comparisons are required; and key restoring means controlled by the function control means for restoring set keys on the control number keyboard.

2. In a machine of the class described, capable of performing accounting operations, each accounting operation including a balance pickup operation, at least one item entering operation in which item entries such as checks and deposits are made to form a new balance, and a new balance operation, said machine having means to read a control number and a balance from a ledger card and entry means to enter the item entries into the machine, the combination comprising means to store said control number throughout the accounting operation; control number means including control keys settable to enter a control number into the machine in conjunction with each entry into the machine; means for comparing each control number thus entered with the control number from the ledger card; manually operable function control means selectively settable to determine the item entries with which the comparing means is utilized in each accounting operation; means controlled by the function control means for rendering the comparing means operable to disable the machine to prevent an entry operation if the control number entered by the control number means is not the same as the control number read from the ledger card; and means to restore any set keys of the control number means after each entry operation.

3. In a machine of the class described, capable of performing accounting operations, each accounting operation including a balance pickup operation, at least one item-entering operation in which additional item entries such as checks and deposits are made to form a new balance, and a new balance operation, said machine having means to sense balance and control number information from the ledger card and also having keyboard entry means for entering withdrawal and deposit items, the combination comprising control number set-up means on which a control number is set; comparison means for comparing the control number read from the ledger card with the control number set up on the control number set-up means and capable of preventing the machine from making a withdrawal or deposit operation when the two numbers do not agree; and manually operable multiple-position function selector means settable to a first position for requiring a control number to be set up on the control number set-up means only for the first item, either withdrawal or deposit, following a card-reading operation, and settable to a second position for requiring a control number to be set up on the control number set-up means for the first item, either withdrawal or deposit, following a card-reading operation plus further items of each accounting operation.

4. In a machine of the class described, capable of performing accounting operations, each accounting operation including a balance pickup operation, at least one item entering operation in which additional item entries such as checks and deposits are made to form a new balance, and a new balance operation, said machine having means to sense balance and control number information from the ledger card and also having keyboard entry means for entering withdrawal and deposit items, the combination comprising control number set-up means on which a control number is set; comparison means for comparing the control number sensed from the ledger card with the control number set up on the control number set-up means and capable of preventing the machine from making a withdrawal or deposit operation when the two numbers do not agree; manually operable multiple-position function selector means settable to a first position for requiring a control number to be set up on the control number set-up means only for the first item, either withdrawal or deposit, following a card reading operation, and settable to a second position for requiring a control number to be set up on the control number set-up means only for the first item, either withdrawal or deposit, following a card reading operation plus all further deposit items of each accounting operation; and further control means selectively operable, when the multiple-position function selector means is in its second position, for requiring a control number to be set up on the control number set-up means for all deposit and all withdrawal items of each accounting operation.

5. In a machine of the class described, capable of performing accounting operations, each accounting operation including a balance pickup operation, at least one item entering operation which item entries such as checks and deposits are made to form a new balance, and a new balance operation, said machine having comparator means for comparing a control number sensed by the machine from a ledger card with a control number manually entered into the machine, a machine operating circuit comprising, in combination, a pair of terminals to which a source of electrical power may be applied; a first circuit path extending between said terminals and including a relay for initiating operation of the machine, an operating switch controlled by any of a plurality of accounting machine control keys including a deposit control key, and a comparator switch in serial relation, the comparator switch being operable to close when the comparator means makes a correct comparison, to condition the machine operating circuit to energize the relay upon closing of the operating switch; a second circuit path connected in parallel to the comparator switch and including a multiple-position function control switch which, in one position, completes said second path to by-pass the comparator switch and condition the machine operating circuit to energize the relay upon closing of the operating switch; and a third circuit path which includes a normally closed switch controlled by the deposit control key to open during a deposit operation, so that said third circuit path is completed to by-pass said comparator switch at all times except during a deposit operation, a correct comparison of control numbers by the comparator means therefore being required only for a deposit operation in which the multiple-position function control switch is not in said one position.

6. In a machine of the class described, capable of performing accounting operations, each accounting operation including a balance pickup operation, at least one item entering operation which item entries such as checks and deposits are made to form a new balance, and a new balance operation, said machine having comparator means for comparing a control number sensed by the machine from a ledger card with a control number manually entered into the machine, a machine operating circuit comprising, in combination, a pair of terminals to which a source of electrical power may be applied; a first circuit path extending between said terminals and including a machine-operation-initiating relay, an operating switch controlled by any of a plurality of accounting machine control keys including a deposit control key, and a comparator switch in serial relation, the comparator switch being operable to close when the comparator means makes a correct comparison, to condition the machine operating circuit to energize the machine-operation-initiating relay upon closing of the operating switch; and a second circuit path which includes a manually operable selector switch in series with a normally closed switch controlled by the deposit control key to open during a deposit operation, so that said second circuit path is completed to by-pass said comparator switch at all times except during a deposit operation when said selector switch is closed, and is ineffective to by-pass the comparator switch when said selector switch is open.

7. In a machine of the class described, capable of performing accounting operations, each accounting operation including a balance pickup operation, at least one item entering operation which item entries such as checks and deposits are made to form a new balance, and a new balance operation, said machine having comparator means for comparing a control number sensed by the machine from a ledger card with a control number manually entered into the machine, a machine operating circuit comprising, in combination, a pair of terminals to which a source of electrical power may be applied; a first circuit path extending between said terminals and including a relay for initiating operation of the machine, an operating switch controlled by any of a plurality of accounting machine control keys including a deposit control key, and a comparator switch in serial relation, the comparator switch being operable to close when the comparator means makes a correct comparison, to condition the machine operating circuit to energize the relay upon closing of the operating switch; and a second circuit path which includes a normally closed switch controlled by the deposit control key to open during a deposit operation, so that said second circuit path is completed to by-pass said comparator switch at all times except during a deposit operation, a correct comparison of control numbers by the comparator means therefore being required only for a deposit operation.

No references cited.

UNITED STATES PATENT OFFICE
CERTIFICATE OF CORRECTION

Patent No. 2,954,159 September 27, 1960

Edward S. Stork et al.

It is hereby certified that error appears in the printed specification of the above numbered patent requiring correction and that the said Letters Patent should read as corrected below.

Column 2, line 27, for "of", second occurrence, read -- or --; column 8, line 27, for "urged" read -- urge --; column 10, line 54, for "it" read -- its --; column 11, line 42, after "set" insert -- in --; column 12, line 5, for "an" read -- in --; column 16, line 69, for "andn" read -- and --; column 17, line 54, for "with" read -- which --; column 18, line 53, for "471" read -- 472 --; column 21, line 17, for "i" read -- is --; line 62, for "econtrolled" read -- controlled --; column 24, lines 15 and 44, after "operation", each occurrence, insert -- in --; the present columns 25, 26, 27, and 28, headed by patent number 2,954,165, were inadvertently inserted in the official grant (only) of Letters Patent No. 2,954,159 and should be canceled.

Signed and sealed this 18th day of April 1961.

(SEAL)
Attest:

ERNEST W. SWIDER
Attesting Officer

DAVID L. LADD
Commissioner of Patents